(12) United States Patent
Hossain et al.

(10) Patent No.: US 8,930,327 B2
(45) Date of Patent: Jan. 6, 2015

(54) METHOD AND SYSTEM FOR SCRUBBING INFORMATION FROM HEAP DUMPS

(75) Inventors: Fiaz Hossain, San Francisco, CA (US); Zuye Zheng, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 336 days.

(21) Appl. No.: 13/097,027

(22) Filed: Apr. 28, 2011

(65) Prior Publication Data

US 2011/0276610 A1 Nov. 10, 2011

Related U.S. Application Data

(60) Provisional application No. 61/343,854, filed on May 4, 2010.

(51) Int. Cl.
| | | |
|---|---|---|
| *G06F 7/00* | (2006.01) | |
| *G06F 17/30* | (2006.01) | |
| *G06F 17/00* | (2006.01) | |

(52) U.S. Cl.
CPC .................. *G06F 17/30607* (2013.01)
USPC .......................................... 707/692; 714/723

(58) Field of Classification Search
CPC  G06F 11/366; G06F 11/3636; G06F 11/0778
USPC .......................................... 707/692; 714/723
See application file for complete search history.

(56) References Cited

U.S. PATENT DOCUMENTS

| | | |
|---|---|---|
| 5,715,450 A | 2/1998 | Ambrose et al. |
| 5,821,937 A | 10/1998 | Tonelli et al. |
| 5,831,610 A | 11/1998 | Tonelli et al. |
| 5,873,096 A | 2/1999 | Lim et al. |
| 5,963,953 A | 10/1999 | Cram et al. |
| 6,092,083 A | 7/2000 | Brodersen et al. |
| 6,154,748 A * | 11/2000 | Gupta et al. ........................... 1/1 |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |

(Continued)

OTHER PUBLICATIONS

Castro et al, Better Bug Reporting With Better Privacy, Mar. 5, 2008, Microsoft Research Cambridge, pp. 1-10.*

*Primary Examiner* — Jacob F. Bétit
*Assistant Examiner* — Amanda Willis
(74) *Attorney, Agent, or Firm* — Ingrassia Fisher & Lorenz, P.C.

(57) ABSTRACT

In production applications that process and transfer secure and sensitive customer data, the heap dump files of these applications, which may be useful for debugging production issues and bugs, may contain secure and sensitive information. Thus, to make the useful debugging information available in heap dumps from production applications without compromising secure client data to those assigned to debugging and fixing production issues, these heap dumps may be scrubbed of sensitive information without scrubbing information that is useful for debugging.

18 Claims, 8 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,549,908 B1 | 4/2003 | Loomans |
| 6,553,563 B2 | 4/2003 | Ambrose et al. |
| 6,574,635 B2 | 6/2003 | Stauber et al. |
| 6,577,726 B1 | 6/2003 | Huang et al. |
| 6,604,117 B2 | 8/2003 | Lim et al. |
| 6,604,128 B2 | 8/2003 | Diec |
| 6,609,150 B2 | 8/2003 | Lee et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,209,929 B2 | 4/2007 | Dominguez, Jr. et al. |
| 7,721,328 B2 | 5/2010 | Boulos et al. |
| 7,802,007 B2 | 9/2010 | Reese |
| 8,069,153 B2 | 11/2011 | Chan et al. |
| 8,108,919 B2 | 1/2012 | Boulos et al. |
| 8,156,085 B2 | 4/2012 | Dominguez, Jr. et al. |
| 8,453,196 B2 | 5/2013 | Lerner et al. |
| 8,453,201 B2 | 5/2013 | Lerner et al. |
| 8,453,202 B2 | 5/2013 | Lerner et al. |
| 8,453,203 B2 | 5/2013 | Lerner et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0210909 A1 | 10/2004 | Dominguez, Jr. et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0201378 A1 * | 9/2005 | Ludwig et al. ............. 370/395.1 |
| 2007/0130130 A1 | 6/2007 | Chan et al. |
| 2007/0288510 A1 | 12/2007 | Dominguez et al. |
| 2008/0126301 A1 * | 5/2008 | Bank et al. .................. 707/3 |
| 2009/0282036 A1 * | 11/2009 | Fedtke ........................ 707/6 |
| 2010/0077468 A1 | 3/2010 | Pragides et al. |
| 2010/0192067 A1 | 7/2010 | Casalaina |
| 2010/0192204 A1 | 7/2010 | Boulos et al. |
| 2010/0281515 A1 | 11/2010 | Lerner et al. |
| 2011/0060842 A1 | 3/2011 | Reese |
| 2011/0083122 A1 | 4/2011 | Chen et al. |
| 2011/0131314 A1 | 6/2011 | Lerner et al. |
| 2011/0225232 A1 | 9/2011 | Casalaina et al. |
| 2011/0225233 A1 | 9/2011 | Casalaina et al. |
| 2011/0225263 A1 | 9/2011 | Sureshchandra et al. |
| 2011/0225495 A1 | 9/2011 | Casalaina et al. |
| 2011/0225500 A1 | 9/2011 | Casalaina et al. |
| 2011/0225506 A1 | 9/2011 | Casalaina et al. |
| 2011/0231835 A1 | 9/2011 | Smith et al. |
| 2011/0238622 A1 | 9/2011 | Walters et al. |
| 2011/0238760 A1 | 9/2011 | Kuruganti et al. |
| 2011/0246417 A1 | 10/2011 | Maya et al. |
| 2011/0247051 A1 | 10/2011 | Bulumulla et al. |
| 2011/0247066 A1 | 10/2011 | Lee |
| 2011/0247069 A1 | 10/2011 | Slater |
| 2011/0258225 A1 | 10/2011 | Taylor et al. |
| 2011/0258233 A1 | 10/2011 | Unger et al. |
| 2011/0258628 A1 | 10/2011 | Devadhar |
| 2011/0264861 A1 | 10/2011 | Fee et al. |
| 2011/0265066 A1 | 10/2011 | Fee et al. |
| 2011/0282899 A1 | 11/2011 | Mathew et al. |
| 2011/0282908 A1 | 11/2011 | Fly et al. |
| 2011/0283163 A1 | 11/2011 | Zheng |
| 2011/0283266 A1 | 11/2011 | Gallagher et al. |
| 2011/0283356 A1 | 11/2011 | Fly et al. |
| 2011/0289356 A1 | 11/2011 | Hossain et al. |
| 2011/0302298 A1 | 12/2011 | Lawrance et al. |
| 2011/0307695 A1 | 12/2011 | Slater |
| 2011/0321150 A1 | 12/2011 | Gluck |
| 2011/0321175 A1 | 12/2011 | Slater |
| 2012/0005537 A1 | 1/2012 | Chen et al. |
| 2012/0030514 A1 | 2/2012 | Lawrance et al. |
| 2012/0041921 A1 | 2/2012 | Canaday et al. |
| 2012/0042383 A1 | 2/2012 | Greene et al. |
| 2012/0042384 A1 | 2/2012 | Badhwar et al. |
| 2012/0047489 A1 | 2/2012 | Varadharajan |
| 2012/0047570 A1 | 2/2012 | Chan et al. |
| 2012/0059853 A1 | 3/2012 | Jagota |
| 2012/0059925 A1 | 3/2012 | Lerner et al. |
| 2012/0059933 A1 | 3/2012 | Lerner et al. |
| 2012/0060199 A1 | 3/2012 | Lerner et al. |
| 2012/0060200 A1 | 3/2012 | Lerner et al. |
| 2012/0066755 A1 | 3/2012 | Peddada et al. |
| 2012/0072783 A1 | 3/2012 | Li et al. |
| 2012/0079560 A1 | 3/2012 | Lerner et al. |
| 2012/0096521 A1 | 4/2012 | Peddada |
| 2012/0096533 A1 | 4/2012 | Boulos et al. |
| 2012/0096534 A1 | 4/2012 | Boulos et al. |
| 2012/0117217 A1 | 5/2012 | Lerner et al. |
| 2012/0117613 A1 | 5/2012 | Lerner et al. |
| 2012/0130973 A1 | 5/2012 | Tamm et al. |
| 2012/0131555 A1 | 5/2012 | Hossain et al. |

(56) References Cited

U.S. PATENT DOCUMENTS

| | | |
|---|---|---|
| 2012/0136602 A1 | 5/2012 | Hossain et al. |
| 2012/0140923 A1 | 6/2012 | Lee et al. |
| 2012/0144374 A1 | 6/2012 | Gallagher et al. |
| 2012/0173485 A1 | 7/2012 | Kothule et al. |
| 2012/0239795 A1 | 9/2012 | Lerner et al. |
| 2012/0240188 A1 | 9/2012 | Lerner et al. |
| 2012/0240189 A1 | 9/2012 | Lerner et al. |
| 2012/0240190 A1 | 9/2012 | Lerner et al. |
| 2012/0259839 A1 | 10/2012 | Chan et al. |
| 2012/0259894 A1 | 10/2012 | Varley et al. |
| 2012/0260341 A1 | 10/2012 | Chan et al. |
| 2012/0330926 A1 | 12/2012 | Rajan et al. |
| 2013/0007049 A1 | 1/2013 | Ziemann |
| 2013/0014211 A1 | 1/2013 | Boulos et al. |
| 2013/0014230 A1 | 1/2013 | Boulos et al. |
| 2013/0019106 A1 | 1/2013 | Fischer |
| 2013/0024788 A1 | 1/2013 | Olsen et al. |
| 2013/0031053 A1 | 1/2013 | Tobin et al. |
| 2013/0031054 A1 | 1/2013 | Tobin et al. |
| 2013/0031061 A1 | 1/2013 | Jagota |
| 2013/0031141 A1 | 1/2013 | Tobin et al. |
| 2013/0031172 A1 | 1/2013 | Olsen et al. |
| 2013/0031491 A1 | 1/2013 | Tobin et al. |
| 2013/0031555 A1 | 1/2013 | Tobin et al. |
| 2013/0031613 A1 | 1/2013 | Shanabrook et al. |
| 2013/0036406 A1 | 2/2013 | Zheng et al. |
| 2013/0036407 A1 | 2/2013 | Zheng et al. |
| 2013/0054714 A1 | 2/2013 | Bedi |
| 2013/0054968 A1 | 2/2013 | Gupta |
| 2013/0060859 A1 | 3/2013 | Olsen et al. |
| 2013/0097253 A1 | 4/2013 | Mencke |
| 2013/0097713 A1 | 4/2013 | White |
| 2013/0117287 A1 | 5/2013 | Jagota et al. |

\* cited by examiner

FIG. 5B 550

| Java.types.user.Tenant | | Instances: 368 | Instance Size: 18 | Total Size: 6624 |
|---|---|---|---|---|
| INSTANCES | FIELDS | | | |
| | Field / Variable Name | Data Type | Value | Address in Memory |
| 1 | tenantName | String | MacroSoft, Inc. | 0x000101 |
| 2 | clientId | Integer | 248 | 0x000121 |
| 3 | subscribedService | String Array | Sales Tracking System | 0x000131 |
| 4 | billingMethod | String | Visa-4605-1978-0928... | 0x000141 |
| 5 | billingAddress | String | 1942 Blitz Way | 0x000151 |
| 6 | customerOfTenant | Customer Array | MacroSoftClients[] | 0x000161.. 0x000261 |
| 7 | | | | |

FIG. 5C

| Java.types.user.Tenant | | Instances: 368 | Instance Size: 18 | Total Size: 6624 |
|---|---|---|---|---|
| INSTANCES | FIELDS | | | |
| | Field / Variable Name | Data Type | Value | Address in Memory |
| 1 | tenantName | String | XXXXX, XXX. | 0x000101 |
| 2 | clientId | Integer | 248 | 0x000121 |
| 3 | subscribedService | String Array | Sales Tracking System | 0x000131 |
| 4 | billingMethod | String | 0-0000-0000-0000-... | 0x000141 |
| 5 | billingAddress | String | XXXX XXXX/XXX | 0x000151 |
| 6 | customerOfTenant | Customer Array | MacroSoftClients[] | 0x000161.. 0x000261 |
| 7 | | | | |

METHOD AND SYSTEM FOR SCRUBBING INFORMATION FROM HEAP DUMPS

CLAIM OF PRIORITY

This application claims the benefit of U.S. Provisional Patent Application 61/343,854 entitled METHOD AND SYSTEM FOR SCRUBBING INFORMATION, by Fiaz Hossain et al., filed May 4, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending or other U.S. patents and patent applications, including the present application, are related to each other. Each of the other patents/applications listed below are incorporated by reference herein in its entirety:

U.S. Provisional Patent Application 61/343,854 entitled METHOD AND SYSTEM FOR SCRUBBING INFORMATION, by Fiaz Hossain et al., filed May 4, 2010 and U.S. Utility patent application Ser. No. 13/097,027 entitled METHOD AND SYSTEM FOR SCRUBBING INFORMATION, by Fiaz Hossain et al., filed Apr. 28, 2011.

FIELD OF THE INVENTION

The current invention relates generally to computer system applications and more specifically protecting privacy.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. In conventional production software debugging, software developers use a variety of tools to browse, inspect, and analyze heap dumps. In general, a heap dump is a compilation of the output of all the live objects and classes in the system memory at a particular point in time. The ability to view and analyze heap dumps may allow software developers to debug system crashes due to memory shortage errors and determine application memory footprints, among other things.

Unfortunately, memory heap dumps may often contain sensitive or secure client data that developers have an obligation to keep private and confidential. Conventional debugging tools and approaches might disclose and compromise sensitive and secure client data to those assigned to debug and fix production application issues.

Accordingly, it is desirable to provide techniques enabling the scrubbing of sensitive and/or secure client data information from production application heap dumps without eliminating non-sensitive technical information.

BRIEF SUMMARY

In accordance with embodiments, there are provided mechanisms and methods for scrubbing portions of information, which are not to be used in debugging processes, from files intended for use in debugging. These mechanisms and methods for scrubbing information can enable embodiments to scrub (remove and/or mask) secured and sensitive client data, that is to remain confidential, while retaining the data that is not sensitive in the file. The ability of embodiments to scrub and/or mask sensitive and confidential customer data that is present within heap dump information, can enable the use of the non-sensitive portions of heap dump information by those assigned to debug and fix production application issues, without compromising the confidential client data.

In an embodiment and by way of example, a method for scrubbing information is provided. The method embodiment includes parsing a heap dump, mapping the heap dump for class dependencies and inheritance, scrubbing certain information based on heuristic rules, and rebuilding the heap dump.

While the present invention is described with reference to an embodiment in which techniques for scrubbing information are implemented in a system having an application server providing a front end for an on-demand database service capable of supporting multiple tenants, the present invention is not limited to multi-tenant databases, is not limited to databases, and is not limited to deployment on application servers. Embodiments may be practiced using other database architectures, e.g., ORACLE®, DB2® by IBM and the like without departing from the scope of the embodiments claimed.

Any of the embodiments described in the specification may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in this specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 5B show an example of a view of a heap dump generated by a heap dump analysis tool prior to scrubbing the heap dump.

FIG. 5C shows an example of a view of a heap dump generated by a heap dump analysis tool after scrubbing and rebuilding the heap dump.

DETAILED DESCRIPTION

Systems and methods are provided for scrubbing information from a production server environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. As used herein, the term view refers to any visual representation of information. For example, a view may be a web page, a dialog box, a window in a standalone application, or any other visual rendering of information in a user interface. As used herein, a selector refers to any visible object in an interface for indicating that a choice has been made between one or more options provided to a user of an interface. For example, a selector may be a link, an icon, a button, a tab, an item in a drop down list, an area for receiving a selection indicator such as a checkbox, a circle for entering a dot, or other marking, a field for receiving text, or any other means of indicating an option that has been chosen by a user of an interface.

System Overview

Figure 1:
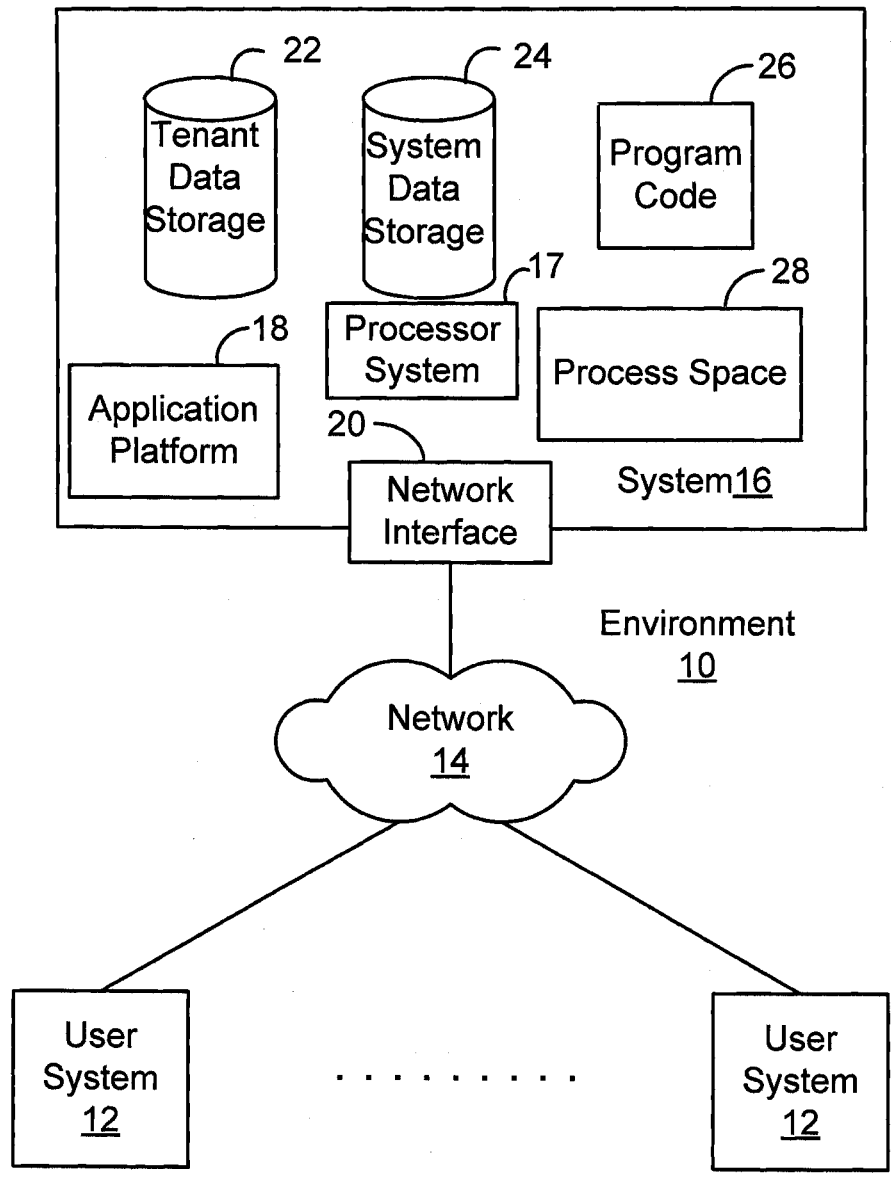
FIG. 1 illustrates a block diagram of an example of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a hand-held computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
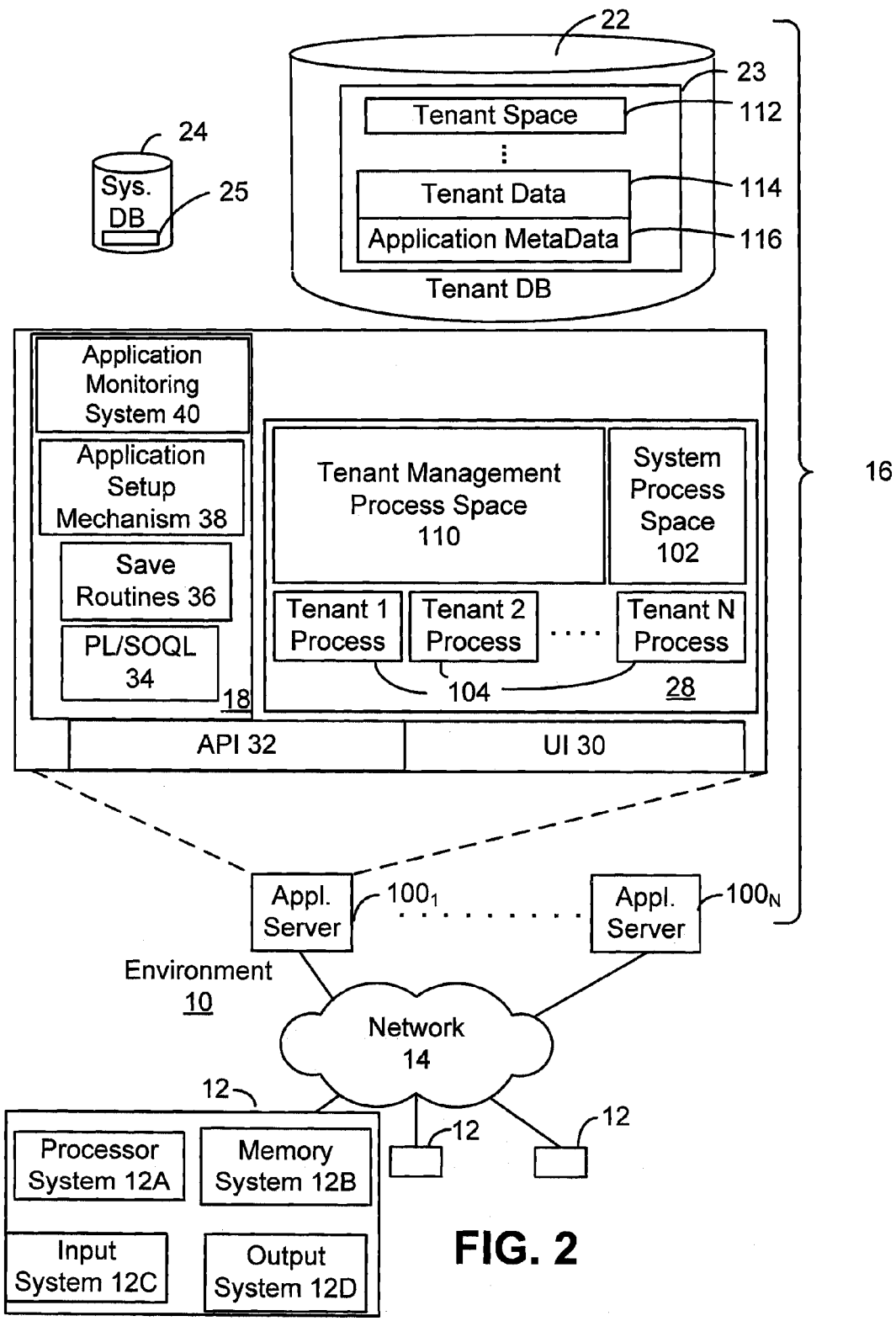
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, application monitoring system 40, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine. In an embodiment, application platform 18 may include application monitoring system 40, which contains the machine readable instructions for scrubbing sensitive client information. Application monitoring system 40 might also track application performance or check for application errors.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Next, mechanisms and methods for enabling the scrubbing of confidential information from a production server environment will be described with reference to example embodiments.

Overview of Parsing the Heap Dump File

In this specification, a heap dump is a data snapshot of the state of the heap of a software application, at a specific time (such as the time of a software crash). The heap may be a portion of the working memory, which may be volatile memory, such as random access memory, for example. The working memory may be memory that is used to perform computations necessary to accomplish tasks currently be performed. The heap dump may contain information about the elements of a software application that were in use at the time the heap dump was created, such as the classes that define the application's functionality and the objects that are instances of those classes.

In an embodiment, the language generating the heap dump data may be Java. Using Java, for example, when an Out of Memory occurs (that is when a particular object or routine uses all or essentially all of the memory allocated for the object or routine), as part of an error handling routine, the Java Virtual Machine heap may be dumped in ASCII or binary format, for example. In an embodiment, heap dump data in a binary format may be easier to process than were the heap dump data formatted using other formats. Accordingly, the binary format may be used by some heap dump analysis tools. Since the format of the heap dump may be binary, the heap dump may contain 1-2 gigabytes of data. In an alternative embodiment, the heap dump data may be formatted in a format other than the binary format.

In the specification, "objects in the heap dump" refers to information, in a heap dump, about the objects that existed in the memory of an application at the time a heap dump was performed. The information about the objects in the heap dump file may include details such as (1) the dependencies of each object (e.g., other objects the current object relies on for at least some portion of the object's functionality), (2) the referential data of each of the objects (e.g., the objects another particular object made references to, and the objects that particular object was referenced by), (3) the type of class each object is an instance of, (4) the amount of memory allocated for each object, (5) the memory address of each object, etc.

Heap dump information may not be easy to understand without knowing the relationships between the objects in the heap dump, and the information about the classes the objects belong to. Parsing the heap dump is useful in determining the relationship between heap dump objects. The heap dump is parsed by examining the heap dump for information related to objects and recreating the objects, by loading the objects and their dependencies into active memory. The loading of the heap dump objects into memory enables the organization of heap dump objects and other heap dump data into a format suitable for viewing, analyzing, mapping and modification, as discussed below.

Figure 3:
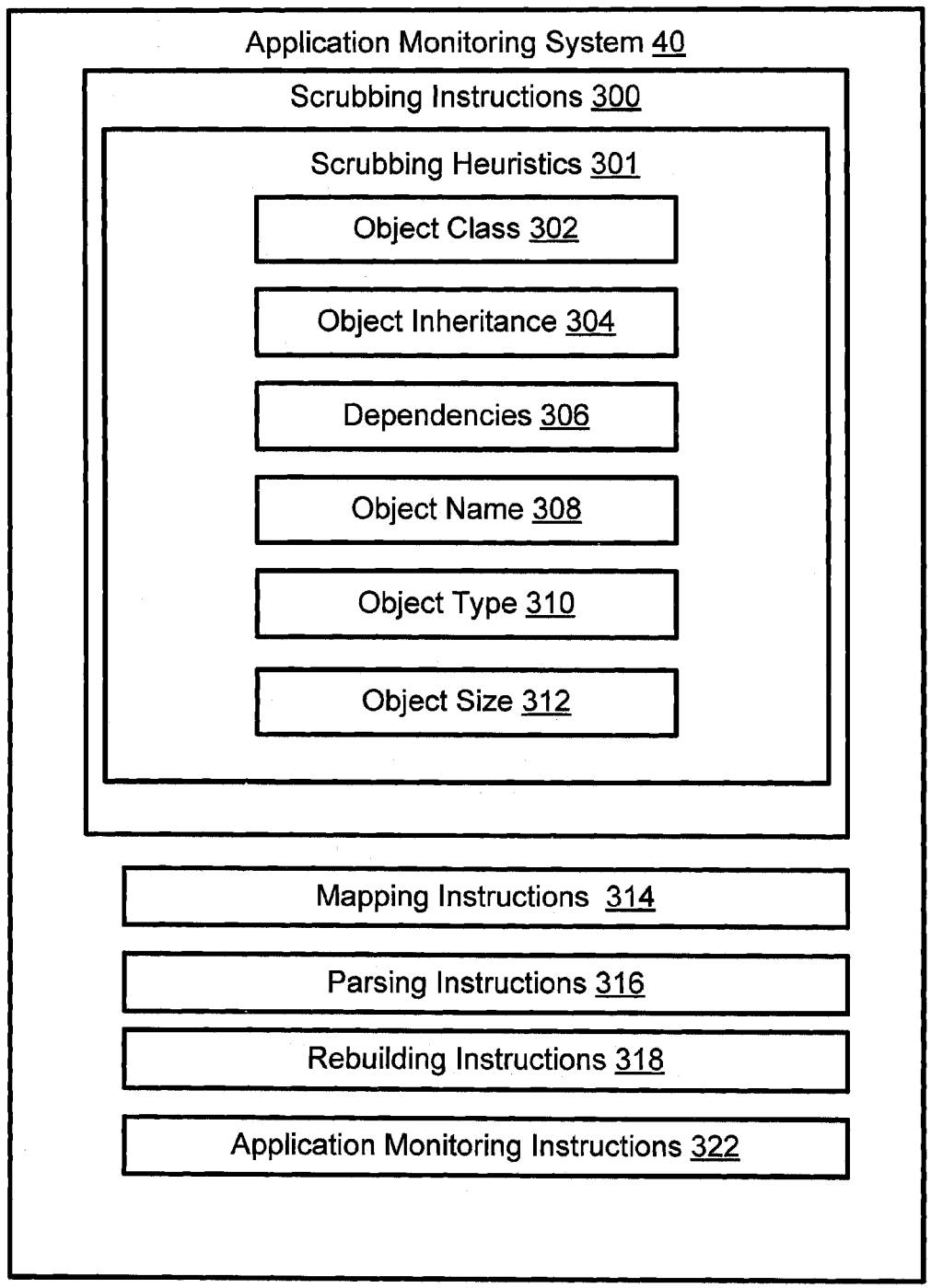
FIG. 3 shows a block diagram of an embodiment of the types of rule based heuristics used to scrub information according to the present invention.

FIG. 3 shows a block diagram of an embodiment of application monitoring system 40. Application monitoring system 40 may include scrubbing heuristics 300, which may include rules 301, which may in turn include rules related to object class 302, object inheritance 304, dependencies 306, object name 308, object type 310, and object size 312. Scrubbing heuristics 300 may also include mapping instructions 314, parsing instructions 316, scrubbing instructions 318, rebuilding instructions 320, application monitoring instructions 322, and/or other elements 324. In other embodiments, scrubbing heuristics 300 may not have the same elements as those listed above and/or may have other elements instead of, or in addition to, those listed above.

In an embodiment, the machine readable instructions for executing the heuristics rules are stored within application monitoring system 40 as well as the instructions for mapping, parsing, scrubbing, and rebuilding the heap dump. Application monitoring system 40 also contains machine readable instructions for monitoring applications.

Scrubbing heuristics 300 is the code that includes the code for implementing the scrubbing process. Rules 301 are the heuristic rules that determine what is scrubbed and/or what is allowed to be scrubbed. Object class 302 includes one or more rules that identify an object based on the object's class. For example the user may enter a list of classes that are expected to contain sensitive information, and certain string variables or any string variable in that class may be scrubbed. Object inheritance 304 includes one or more rules that determine that an object may need to be scrubbed based on an inheritance from a class that is flagged for scrubbing. For example, string variables over a certain size that are inherited from a particular class may be scrubbed automatically. Dependencies 306 may include rules that are based on dependencies of an object. For example, if an object is a child of an object that has variables that need to be scrubbed or that is flagged for scrubbing, the object may be considered for scrubbing. Object name 308 includes rules that are based on the name of the object. For example, the user may enter in a set of names of objects that need to be scrubbed. Alternatively or additionally, the system may automatically look for variables and/or objects containing certain strings, such as "credit," "address," and "name." Object type 310 may allow objects to be scrubbed based on the object's type, and may consider an object for scrubbing or allow an object to be scrubbed if the object is of a certain type. Object size 312 may include rules for scrubbing an object based on the object's size. For example, if an object is larger than a certain size, the object may be considered for scrubbing. In an embodiment, the scrubbing may occur automatically, if certain combinations of rules are met. For example, if the object belongs to a certain set of classes flagged as having objects that need scrubbing, inherited from a flagged class, is a child of a certain class, and if the object also is greater than a certain size, has certain strings in the name, is a string variable, or of a certain type the object may be automatically scrubbed. Mapping instructions 314 may include instructions for determining the names of objects and the dependencies of the objects in a heap dump (see the description of FIG. 4 for further details) for example. Parsing instructions 316 may include instructions for creating objects in working memory, labeling the objects with the addresses of the objects of the heap dump and storing the addresses of the objects that called each object in association with the object that was labeled with the address of the object called (see the description of FIG. 4 for further details). Scrubbing instructions 318 may include instructions for replacing information stored in an object with nonsense information to keep the original information confidential. Rebuilding instructions 320 may include instructions for rebuilding the heap dump after the objects that need scrubbing have been scrubbed. At the conclusion of step 320, the scrubbed heap dump is identical to the original heap dump, except the sensitive information has been replaced with nonsensitive information (e.g., nonsense information such as a sting of zeroes). Application monitoring instructions 322 monitors the application as the application is running and causes the contents of memory to be dumped into the heap dump in the event of an error, such as an out of memory error. Other elements 324 may include other elements in scrubbing heuristics 300, such as tasks that clean up working memory after a heap dump is created or clean working memory prior to terminating scrubbing heuristics 300. Other elements 324 may include a task for either deleting the original heap dump file after creating the scrubbed heap dump or securing access to the original heap dump file so that the original heap dump file is only accessible to users with proper authorization.

In an embodiment in which an object oriented language is used, class inheritance properties may be used to map dependencies. Inheritance properties may be determined by a heap dump tool based on the manner in which elements of an object are referenced and implemented, as elaborated on in the example below.

The following example is referenced in the discussion examples below. The class User may exist for receiving and storing information associated with a user of a software application. In a particular run of a particular code the class User may be assigned the memory address 0x3384290. The class User may contain the variables userName, UserID, UserPassword, and UserAddress, and the function enrollUser( ). The class Tenant may be created to extend the functionality of the class User to include the enrollment of a distinct category of users defined as "tenants." In a particular run of a particular code the class Tenant may be assigned the memory address 0x9274365. The Tenant class inherits the fields userName, UserID, UserPassword, and UserAddress, and the function enrollUser( ) from the User class, while adding new variables such as subscribedService and BillingMethod, and new functions such as setBillingInformation( ). In a particular run the variable BillingMethod may have an address 0x30000080 [10000] A for storing a credit card number (e.g., Visa-4605-1978-0928-0000), and the function setBilling information may be assigned a memory address 0x50001010 [6000] G for storing the name of the entity to which invoices are addressed (e.g., MarcoSoft, Inc.) and a memory address 0x500020200 [4000] B for storing the billing address (e.g, 1942 Blitz Way). The class EndUser may be created to extend the functionality of the class User to include the enrollment of a distinct category of users defined as "end users." In a particular run of a particular code the class EndUser may be assigned the memory address 0x4365927. The EndUser class inherits the variables userName, UserID, UserPassword, and UserAddress, and the function enrollUser( ) from the User class, while adding new variables such as clientofTenant, and new functions such as associateEndUserWithTenant( ). In the above example, any object of the type Tenant or EndUser is also an object of the type User. However, an object of type Tenant is not an object of the type EndUser, and vice versa.

Figure 4:
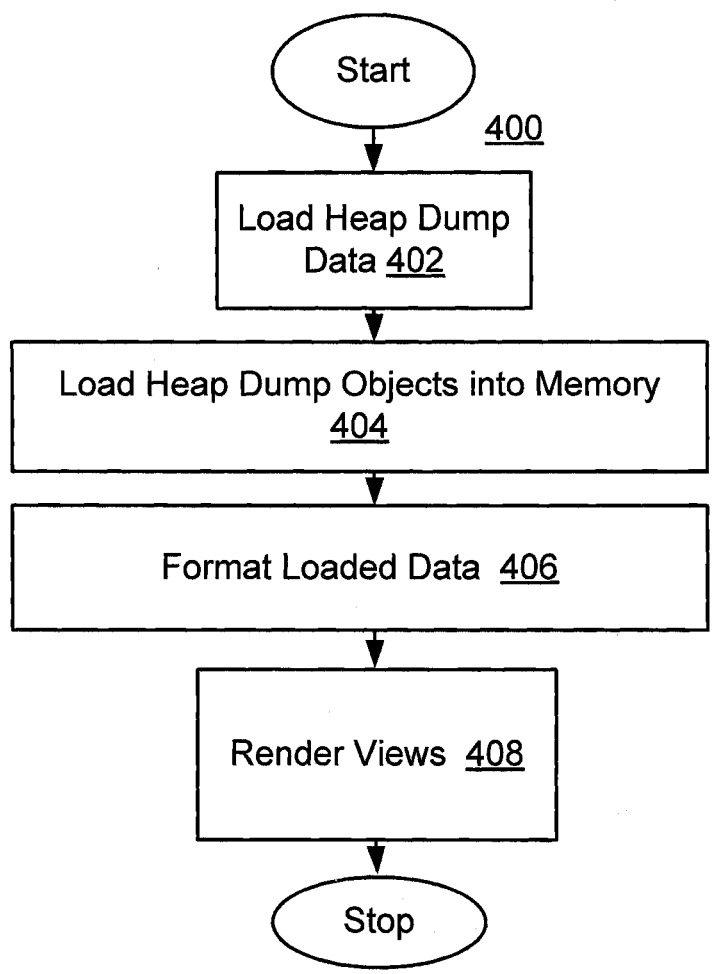
FIG. 4 shows a flowchart of an example of a method of parsing heap dump information according to the present invention.

FIG. 4 shows a flowchart of an example of a method of parsing heap dump information according to the present invention. In an embodiment, the method of parsing heap dump 400 comprises the following steps, loading the heap dump data 402, loading objects into memory 404, formatting loaded data 406, and rendering views 408. Each of these steps is discussed further, below.

In step 402, the raw heap dump file is loaded (e.g., opened and placed into the working memory) for reading by a heap dump analysis tool (e.g., a tool for reading and analyzing heap dump data), so that the raw data may be worked on further. In step 404, the heap dump analysis tool parses the raw heap dump data by, for example, scanning the raw heap dump for data related to the objects and the objects' dependencies, and loading equivalent objects and information related to the dependencies of the objects into active memory. For example, the raw heap dump data may include lines that list and address of an object of interest and addresses of objects that called or otherwise referenced the object of interest. During the parsing, an object is created that is labeled in order to represent the address of the object of interest, and the addresses of the objects that referenced the object of interest are stored in association with the object created to represent the object of interest. The dependencies are actually determined and mapped in the method of FIG. 5. In other words, in step 404, the information in the heap dump is loaded into memory so that the information may be worked upon, and optionally the information of the heap dump is organized in a manner to facilitate querying and operating on the information, but the actual querying and determination of the dependencies occurs in the method of FIG. 5. As part of step 404, objects are created in the working memory that corresponds to objects referenced in the heap dump. The objects created may store information about the dependencies (such as the addresses of the objects that called the created objects) corresponding to the dependencies indicated in the heap dump. The objects created may also be labeled with addresses indicated in the heap dump (however, although as part of step 404 identifiers of objects of the heap dump are associated with a corresponding set of objects in working memory and information about dependencies (e.g., in the form of address of the objects related to the objects created) may be stored in association with the objects created, in an embodiment, no actual map of the objects, the object's names, and object's dependencies is created until the method of mapping discussed FIG. 5).

In step 406, the loaded heap dump objects and other data are formatted for examination and/or modification. In optional step 408, the heap dump data is rendered for navigation via a user interface, such as a web browser. The formatting and rendering of the heap dump data are discussed in greater detail below. Step 408 may be performed when it is desirable for a human to monitor the output of method 400. However, the method of FIG. 4 may be performed automatically following method 400 without human monitoring or intervention.

Formatting Heap Dump Data

The formatting of the heap dump data may include organizing heap dump objects into categories, based on one or more pieces of information about the objects, such as the class type of the objects, the number of objects of each class, the size of objects of each class, the dependencies of the objects, or other attributes of the objects. In an embodiment, the object type may be the last of a series of strings that are separated by periods in the name of the object. In other embodiments, the objects may be categorized by different object attributes, or the objects may not be categorized at all. In some embodiments, the organizing of the heap dump objects is performed automatically by a heap dump analysis tool. In other embodiments, the organizing of the heap dump objects may be performed based on the input of a user who analyzes a heap dump.

In some embodiments, the heap dump data is organized by running queries on the objects loaded into memory using an object querying language, such as OQL, and organizing the query results in a way that suitably matches the nature of the query. For example, a query may be run for selecting all objects containing strings, and returning the objects in descending order based on the size of the objects. The heap dump analysis tool may consist of a series of OQL queries (or statements in another language) that produce a series of views of the heap dump data.

Rendering Heap Dump Data for Navigation

After the heap dump data has been formatted and categorized as described in step 406, views (e.g., web pages) may be generated by the heap dump analysis tool for presenting heap dump objects by category. Selectors (e.g., links) may also be generated for navigating between the categorized views. Optionally, a selector may automatically issue an OQL query or another type of command that automatically generates a view anew. Examples of categorized views are shown below.

Example of a View Categorizing Objects by Instance Count

| OBJECTS BY INSTANCE COUNT OF ALL CLASSES | |
| --- | --- |
| CLASS NAME | INSTANCE COUNT |
| java.obj.EndUser | 11,198 |
| java.obj.Tenant | 233 |
| java.obj.SysManager | 4 |

Example of a View Categorizing Objects by Address

| OBJECTS BY ADDRESS | | | | |
| --- | --- | --- | --- | --- |
| ADDRESS OF CURRENT OBJECT | NO. OF CHILDREN | ADDRESS OF REFERENCED OBJECT(S) | SIZE | CLASS NAME |
| 0x3384290 | 2 | 0x9274365, 0x4365927 . . . | 32 | java.obj.User |
| 0x9274365 | 0 | | 32 | java.obj.Tenant |
| 0x4365927 | 0 | | 32 | java.obj.EndUser |

In the above example views, the class names java.obj.User, java.obj.Tenant and java.obj.EndUser refer to the User, Tenant, and EndUser classes of the example described just prior to the beginning of the discussion of FIG. 4.

Detailed views may also be generated for presenting information about individual objects, the detailed views containing details about each object that are not present in the views categorizing the objects. For example, one view may list each object and how many children each object has, and the detailed view may include information about which classes are children of a particular class and how many times the parent was invoked by each child. As described above in reference to the categorized views, selectors may be generated for navigating between the detailed views. An example of a detailed view is described in conjunction with FIG. 5B.

Overview of Mapping a Heap Dump

Mapping clarifies what is represented by the information in the parsed heap dump. For example, mapping may be used to derive information about the dependencies or inheritance of objects, and use that information to identify the specific relationship that existed between the objects and/or the classes the objects are based on. Mapping may also be used to keep track of the objects containing information that should be scrubbed, and to designate one or more rules that should be used to scrub each of the objects.

A heap dump map may be created by (1) correlating information about classes (such as the structure of the class) with information about objects constructed from the classes, (2) determining how objects derived from different classes relate to one another, (3) identifying objects and object elements that are candidates for containing information that should be scrubbed, and (4) creating a mapping of the information for keeping track of the interrelations between the classes and objects, the attributes of the classes and objects, and the candidates for scrubbing that have been identified. Mapping may be performed because an object's (or an instance dump's) name may not be easily determined from the heap dump due to the format of the object or instance dump (in an embodiment, an instance dump may be the portion of the heap dump having data about the state of objects at the time the objects were in active memory). The object's name (e.g., the name of the class the object is constructed from) is stored in the class dump that an instance dump is linked to. Due to inheritance, an object may share characteristics with another object. In an embodiment, identifying characteristics shared between objects (e.g., by identifying memory addresses that are referenced by two different objects in the instance dump) may be helpful in determining whether the objects are of the same class type, or if the objects are related to one another.

Figure 5A:
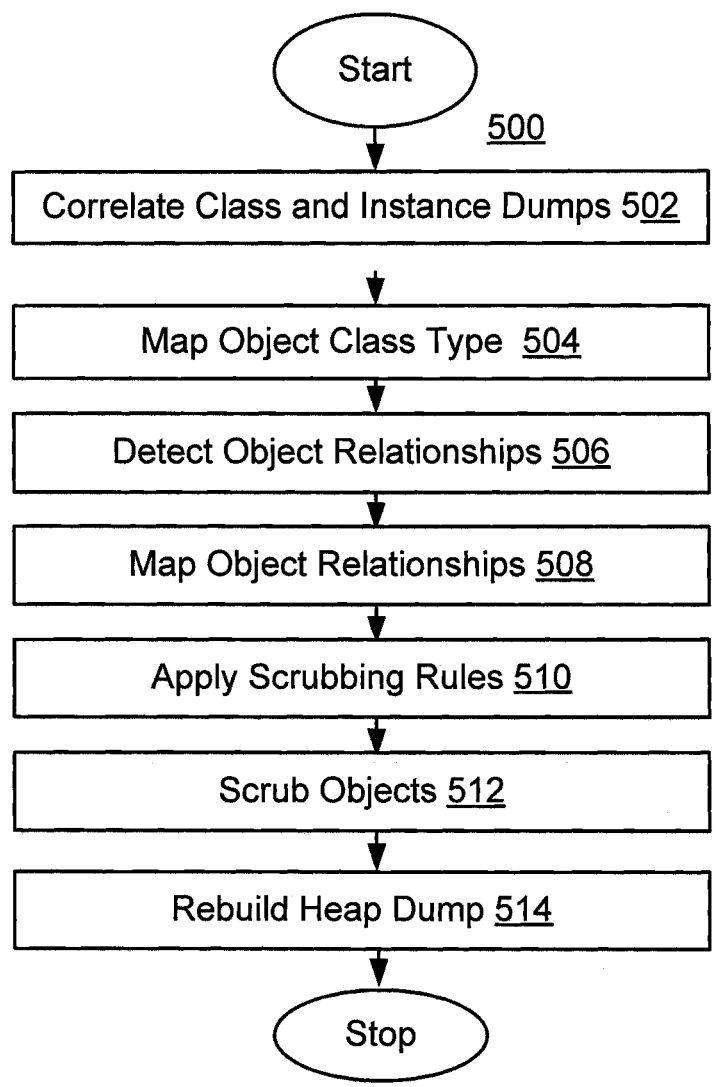
FIG. 5A shows a flowchart of an example of a method of mapping and scrubbing heap dump information according to the present invention.

FIG. 5A shows a flowchart of an example of a method of mapping heap dump information according to the present invention. In an embodiment, the method of mapping heap dump information 500 comprises the following steps, correlate class and instance dumps 502, map object class type 504, detect object relationships (and detect objects that need to be scrubbed) 506, map object relationships (and map objects that need to be scrubbed) 508, apply scrubbing rules 510, scrub objects 512, and rebuild heap dump 514. Although for a given object steps 502-514 may tend to be performed in a particular order, each of steps 502-514 may be performed simultaneously. Each of these steps is discussed further, below.

Correlating Class and Instance Dumps

In step 502, the heap dump data for each class is correlated with the heap dump data for all the objects derived from each class. In an embodiment, the correlation of the class dump with the instance dump allows the class type of each object to be determined. In an embodiment, during the correlation step 502 a determination is made as to which objects belong to which class. The relationship between the classes and storing the relationships in an organized manner for later use may be left for steps 504, 506 and 508.

In this specification, the portion of heap dump data related to the classes that define objects is referred to as the class dump, and the portion of heap dump data related to objects derived from classes is referred to as the instance dump. In other words, in an embodiment, the heap dump may include two portions, which will be referred to as the class dump and the instance dump.

Heap dump information may not be easy to understand without first knowing how a class dump corresponds or is correlated to an instance dump. For example, when object data is stored in an instance dump (or other portion of a heap dump) the name of an object's class, and other details about the object, may be unclear or difficult to determine using the object data alone (e.g., what the instance data represents may be unclear until the instance data is correlated—e.g., linked—with the class data). The class data for a particular class may include information relevant to all objects constructed based on the particular class. Correlating the class dump and the instance dump may be performed, because an object's name may not be easily determined from the heap dump due to the format of the object or instance dump. The object's name may be stored in the class dump that an instance dump may be linked with (correlating the class dump and instance dump facilitates associating the objects name with the corresponding instance dump). Additionally, the inheritance properties of objects may not be easy to understand without using the class dump's data for classes to correlate the instance dump's data about objects. Due to inheritance, an object may share characteristics with another object, and it may be desirable to determine how objects are linked by other objects to yet other objects.

A feature of classes (that determines the content of the working memory at the time of the dump that is used in performing the correlation) is that the classes (that are related to the data being scrubbed) may be similar to a blank, unfillable template that specifies, prior to active use, the structure and functionality of a portion of application code, and the object is comparable to a fillable version, or instance, of the template defined by a class. Consequently, when an attribute of a parent class is assigned a particular value in a child class, the address for that attribute will appear in the class dumps of each the parent and child class. The class may be defined by the class attributes, such as the class name, type and size. In an embodiment, the class dump may be the portion of the heap dump data having data related to a class's attributes and the addresses in memory that were allocated for constructing objects based on the class. The class's attributes may be extracted to facilitate the correlation. In other words, the class dump may be used to identify objects that are created according to the specification of the particular class (e.g., instances of the class) or identify objects having the particular class type, and after the objects have been identified, the information may be used in correlating the class dump and the instance dump.

For example, regarding correlating and determining of the dependencies of the objects of a heap dump and step 502, the instance dump may include a list of objects that happen to be in memory at the time that the memory is dumped (to form the heap dump). Each object in the instance dump may be associated with the address of that object and the addresses of objects that called that object. Optionally, each object in the instance dump may also be stored with the size of the object, the instance number of the object, and/or the name of the object. The class dump may include a list of objects created for the source code to run, an address of the object created and addresses set aside for that object to use. Optionally, in the class dump, each object may also be stored with the amount of memory that is allocated for that object. An example of an instance dump appears below.

An Example of an Instance Dump Prior to Correlation with a Class Dump

| OBJ. ADDRESS | SIZE | ADDRESS OF REFERENCING OBJECT(S) |
|---|---|---|
| 0x3384290 | [32] | 0x9274365, 0x4365927 . . . |
| 0x9274365 | [32] | 0x0 |
| 0x4365927 | [32] | 0x0 |

An Example of an Instance Dump After Correlation with a Class Dump

| OBJ. ADDRESS | NO. OF CHILD. | ADDRESS OF REFERENCING OBJ.(S) | SIZE | CLASS NAME |
|---|---|---|---|---|
| 0x3384290 | 2 | 0x9274365, 0x4365927 . . . | 32 | java.obj.User |
| 0x9274365 | 0 | | 32 | java.obj.Tenant |
| 0x4365927 | 0 | | 32 | java.obj.EndUser |

In an embodiment, as part of step 502, the name of the object (if not present in the instance dump) and the other objects that a particular object of an instance dump is associated with (e.g., as a result of an inheritance or other dependency) may be determined by searching for the object's address in the class dump, and then locating and reading the name of the object that the address is associated with. The name of the object that the address is associated with may appear next to the address, which may be listed on the same line as the address, above the list of addresses set aside for the that object, or below the list of addresses set aside for that object (depending on the format in which the heap dumps are produced). Determining the location of the class dump and instance dump may depend on the format in which the heap dump is provided (correlating the relationship between objects will be discussed in step 506). The instance dump (e.g., as a result of including an association between the name of the object and addresses associated with the object) may contain data indicative of (1) references made by one object (which will be referred to as object x) to another objects (which is not necessarily used in determining the object name by step 502, but may be used in step 506 in detecting the object relationships), (2) the addresses in the memory of the objects that are referred by object x (which is not necessarily used in determining the object name by step 502, but may be used in step 506 in detecting the object relationships), (3) the number of child objects that exist for object x (which is not necessarily used in determining the object name by step 502, but may be used in step 506 in detecting the object relationships), and (4) additional information about the object x (for example, the object's size in memory). Instance dump data may not necessarily contain an indication of the name or type of class objects were derived from, as shown in the example above, which may need to be determined by comparing the addresses in the instance dump with the addresses of the class dump.

In step 504, the class type of each object is mapped using the identifying information that was obtained in step 502, by storing the object addresses, names, and/or other identifying information in association with one another, for example.

In step 506, the relationships between heap dump objects are detected. In other words, in general, in Object Oriented Languages each object in a heap dump was derived from one or more base objects and/or one or more parent objects, and in step 506 the relationship between the base objects and parent objects (e.g., which object is a parent and/or base object for which other objects) is detected. The class dump data (or other data) within the heap dump may be used for identifying the one or more base object and/or parent object that a specific object was inherited from. Examples of relationships between classes may be the chain of inheritance of a particular class (e.g., whether a given class has a parent class and/or base class), and the dependencies of a particular class on a non-ancestral class (a class that is not a direct parent class).

In this specification, a child class is a class established for extending the functionality of a preexisting class, such as by adding variables and/or methods that are exclusive to the extended class. The new class that is established is a child of the preexisting class, and the child class relies on the structure, data, and methods of the preexisting class for all functionality that is not exclusive to the child class.

As part of the detecting relationships in step 506, class dumps may be used to identify objects in the heap dump data that were constructed from the classes contained in the class dumps (e.g., to determine which class each object belongs to). For example, the data of a class dump may be used to identify a subset of objects within an instance dump as being objects of the class type Tenant, and another subset of objects may be identified within an instance dump as being objects of the class type EndUser. In an embodiment, a link (e.g., a piece of data, such as a shared address, or other data establishing a relationship) between a set of class dump data and a set of instance dump data may exist in the heap dump data. In an embodiment, the link is the memory address of an object.

For example, the class dump may contain the memory addresses allocated for constructing objects of each type of a class that exists in the class dump. The instance dump may contain details about the objects in the instance dump, including the address in memory of the object (as described above). If a match is found between the memory address of an object in an instance dump and one of the memory addresses of the classes associated with a class type that exists in a class dump, the object is identified as an object (e.g., instance) of the class type having the matching address. Alternatively, as a result of being constructed according to the specification defined in a class, the attributes of the object may be compared to the specification of classes contained in the class dump. As a result of the comparison, a determination can be made as to what the class the object is constructed from, and objects may then be compared to one another to determine whether or not the objects were constructed from the same class.

In an embodiment, determining relationship between classes may include one or more of the following, (1) identifying, in the heap dump data, a reference made by an object of a particular class to an element (e.g., a method, function, or field) of an object of another class (which may be performed by identifying memory addresses that are in a portion of the heap dump associated with one of the objects and identifying the same memory address in a portion of the heap dump or another dump associated with the other one of the objects); (2) determining, based on the nature of the reference (e.g., whether the reference appears in both the instance dump and class dump or just in the instance dump or whether the reference appears as an address that called an object or appears as an address that is allocated to the object), a relationship between the class of the object making the reference and the class having the method or field that is being referenced; (3) identifying information about the dependencies of an object on one or more other objects, identifying the whether an object is inherited from one or more other objects, and (4) based on the nature of the dependency or inheritance, determining a relationship between the objects.

In an embodiment, if an object does not have a parent object, does not have a base object, or does not have dependencies on other objects, the object may be identified as a non-related object (e.g., an object having no relationships to other objects). In an alternative embodiment, non-related objects may not be included in the mapping.

In an embodiment, the references made between objects may be contained in the instance dump and the names of the classes that the objects were created from may be contained within the class dump. In an embodiment, the names of the classes may be used as part of identifying relationships between objects. In an alternative embodiment, other data within the heap dump may be used for identifying relationships between objects.

In an alternative embodiment (which may be incorporated within the current embodiment), as part of step 506, dependency information may be automatically gleaned from the name of the object in the class dump (and/or in the instance dump if names of objects appear in the instance dump). For example, the heap dump (or the class dump) may be searched for strings containing one or more periods ("."), and strings containing periods may be categorized as class method names, and the dependencies of the method may be inferred, by labeling the string before the first period as the parent class, the string between the prior period (the first period) and next periods as a child class of the parent class, and each string between each subsequent prior period and next period as a child class of the prior class until the end of the entire string in which the last string is not followed by a period, depending on the language of the source code. Similarly, the heap dump may be scanned for stings including colons or two consecutive colons, which may indicate other types of dependencies, depending on the language of the source code.

In other embodiments, the information for establishing a relationship between the class dump and the instance dump may be another piece of information related to both objects and classes. In an embodiment, the objects of the instance dump are loaded (e.g., recreated in active memory), as described in step 404, and the loaded objects are the objects used for the correlating described in the current step.

In step 508, the heap dump map is updated to include the relationships between objects that were detected in step 506. The mapping of object relationships is discussed in further detail below.

In an embodiment, objects of two different types may reference an object containing confidential data, and these two objects may also be mapped as potential candidates for having confidential information. The mapping data may be stored for later use (e.g., for rebuilding a heap dump after removing confidential information using only the portion of the heap dump's original data that does not include confidential information).

All of the objects of inherited classes may be mapped to the objects of parent classes so that it can be determined what the heap dump data means and which class the instance dump objects belong to. The mapping process may also be used to determine which classes belong to which threads, how instance dumps are linked to each other, etc. The mapped relationships may be used for heuristic based scrubbing, as described in step 512, as only data belonging to a particular class and linked to a particular object may be scrubbed. Thus in the above example, when values for variables userName, UserID, UserPassword, and UserAddress, and the function enrollUser( ) from the User class appear in the instance dump for the class tenant, a dependence may be inferred to the class user.

When a relationship between objects is detected, the heap dump tool maps the relationship between the objects, based on the nature of the relationship. As each object's relationship to other objects is detected, information about the hierarchy of the objects may also be mapped. Additionally, when objects are mapped, rules may be applied for identifying elements of an object that may contain data that should be scrubbed (e.g., erased or replaced with meaningless or unessential data), as discussed below in step 510.

In step 510, heuristic rules (rules that are heuristic in nature) are applied for determining whether an object being mapped contains data that should be scrubbed (in this specification the term heuristic rules refers to rules that are heuristic in nature). The heuristic rules may give correct results most of the time, but may not necessarily be based on fundamental principles and/or may not necessarily guarantee correct results all of the time. In an embodiment, during the mapping, the data that should be scrubbed may be identified by applying the heuristic rules, and optionally a flag (or other indicator) may be included in the mapping for indicating that the object contains data to be scrubbed and for indicating the element of the object containing the data to be scrubbed is added to the object map.

For example, one rule may identify object elements of the type string that containing 30 characters as having data to be scrubbed. Accordingly, whenever an object in the heap dump containing String elements having more than 30 characters is detected, the mapping data for that object will include an indicator that the object, or an element of the object, is a string that may contain confidential information, and should be considered for scrubbing. In an embodiment, the indicator may include information about which scrubbing rule was applied for each object that was identified as a candidate for scrubbing. Other examples of heuristic rules are, scrub objects containing strings, scrub objects inherited from a particular base class that, sometimes, often, or typically stores confidential information, scrub objects that are child objects of a particular class, scrub objects having a specified name, and scrub object types that are final or static. Heuristic rules were also discussed above in conjunction with FIG. 3. In an embodiment, any one of, any combination of, or all of the above heuristic rules may be used for identifying objects to be scrubbed. In other embodiments, other heuristic rules may be used for identifying objects to be scrubbed.

In step 512, the objects and object elements identified within the heap dump mapping as candidates for containing confidential information are scrubbed by implementing code associated with the scrubbing rule designated in step 510. In an embodiment, the scrubbing of an object may be the masking of confidential data contained in the object by replacing the data with zeroes, (or X's, and/or one or more other characters). For example, the heap dump data for an object of the type Tenant may include information related to the string variable BillingMethod, and the value associated with that variable, "Visa-4605-1978-0928-0000." In the current example, the code for applying a heuristic rule for scrubbing an object of the type String may be
if an object is of the type Tenant
for each variable of type String within the object that has the name BillingMethod
replace value of that variable string with "00000000000."

In an embodiment, the objects that are scrubbed are the objects loaded into memory in step 404. In alternative embodiments, the scrubbing may be another method of concealing or removing of confidential data contained in an object.

In step 514, the heap dump is rebuilt (e.g., recreated) by using the objects that were loaded, examined, mapped and/or scrubbed in step 404 and steps 502-512. In steps 502-512, the relationship data and or data about the re-loaded objects was mapped, and confidential data was scrubbed (if present). In the current step, the original heap dump file is rebuilt by creating a new data snapshot of the mapped and/or scrubbed objects, and saving the new dump file in manner that allows it to replace the original heap dump file.
Example of Heap Dump Prior to Scrubbing
0x30000080 [10000] G Visa-4605-1978-0928-0000
0x50001010[6000] A MacroSoft, Inc. 0x50002020
0x500020200x50002020[4000]   B   1942   Blitz   Way
0x10007030 0x50006040 0x50004050
Example of Heap Dump after Scrubbing
0x30000080 [10000] G 00000000000
0x50001010[6000] A 00000000000 0x50002020
0x50002020[4000]    B    00000000000    0x10007030
 0x50006040 0x50004050

The new, scrubbed heap dump created in the current step is safe for debugging and free of sensitive and secure customer information and data.

In an embodiment, each of the steps of method 500 is a distinct step. In another embodiment, although depicted as distinct steps in FIG. 5, step 502-514 may not be distinct steps. In other embodiments, method 500 may not have all of the above steps and/or may have other steps in addition to or instead of those listed above. The steps of method 500 may be performed in another order. Subsets of the steps listed above as part of method 500 may be used to form their own method.

FIG. 5B shows an example of a view 550 of a heap dump displayed in a heap dump analysis tool, prior to scrubbing, as generated according to step 408. In an embodiment, example view 550 may include object class name 552, number of instances 554, instance size 556, total size of instances 558, instance index header 560, instance field header 562, variable name index header 564, data type index header 566, value index header 568, address index header 570, selected instance indicator 572, instance index 574*a-n*, variable name index 576*a-m*, data type index 578*a*-1, variable value index 580*a-o*, which includes sensitive values 580*b*, 580*e*, and 580*f*, and address value index 582*a-p*. In other embodiments, example view 550 may not have the same elements as those listed above and/or may have other elements instead of, or in addition to, those listed above.

In an embodiment, a heap dump consists of data related to the objects of a software application that were present in the memory (e.g., on the heap) of a system running the software at a specific time (e.g., at the time the heap dump was created).

Example 550 is a view of the heap dump displayed by an analysis tool as a categorized readout. In the current embodiment, Example View 550 presents the heap dump information is categorized according to object class type, object instances, object elements, element data types, element values and location of values in memory.

Class name 552 is the name of the class the objects of Example View 550 belong to. In an embodiment, Class name 552 is displayed using a notation that denotes the data type and chain of inheritance of the named class.

Number of instances 554 is the sum of all instantiated objects of the currently displayed class type that are contained within the heap dump. Instance size 556 is the size, in bytes, of an instantiated object of the current class type. Total size of instances 558 is the product of Number of instances 504 and Instance size 506. Instance index header 560 is a header for identifying a list of viewable instances of the currently viewed class type. Instance field header 562 is a header for identifying a category of elements that may be contained within an instantiated object of the currently viewed class type. Variable name index header 564 is a header for indentifying an index of names for variables contained within an instantiated object of the currently viewed class type. Data type index header 556 is a header for indentifying an index of data types associated with the elements (e.g., variables) contained within an instantiated object of the currently viewed class type. Value index header 568 is a header for indentifying an index of values associated with the variables contained within an instantiated object of the currently viewed class type. Address index header 570 is a header for indentifying an index of addresses, in memory, associated with the elements (e.g., variables) contained within an instantiated object of the currently viewed class type. Selected instance indicator 572 indicates which instance within instance index 524*a-n* (discussed below) is currently displayed. Instance index 574*a-n* is a list of all instantiated objects of the currently displayed class type. In an embodiment, when a particular instance within instance index 574*a-n* is selected, Example View 550 is updated to display the information within the heap dump that is associated with the selected instance. Variable name index 576*a-m* is a list of all the named (e.g., defined) elements of the currently viewed instance. Data type index 578*a*-1 is a list of the data types associated with each of the items of variable name index 576*a-m*. Variable value index 580*a-o* is a list of the values associated with each of the items of variable name index 576*a-m*. Sensitive values 580*b*, 580*e* and 580*f* are examples of variables that contain sensitive information that needs to be scrubbed. In this example, 580*b* is the tenant name, 580*e* is the tenant billing address, and 580*f* is a tenant credit card number. Address value index 582*a-p* is a list of the memory addresses associated with each of the items of variable value index 580*a-o*.

In an embodiment, a map outlining the relationships and hierarchy of the objects within a dump can be constructed from the information shown by the analysis tool. In an embodiment, this map is created automatically by the analysis tool, in other embodiments the map could be generated manually or by a separate program.

In other embodiments, there may be more or less fields displaying different attributes and/or elements of objects within the heap dump. In other embodiments, there might be more information windows within the analysis tool displaying more information specific to the heap dump or the specific object selected.

FIG. 5B shows an example of a view 590 of a heap dump displayed in a heap dump analysis tool, after having been scrubbed and rebuilt. View 590 includes Scrubbed variables 590*b*, 590*e* and 590*f*. In other embodiments, example view 590 may not have the same elements as those listed above and/or may have other elements instead of, or in addition to, those listed above.

In an embodiment, the only difference between view 550 and 590 is that view 550 includes the sensitive information and in view 590 the sensitive information has been replaced with dummy values. Consequently, although not labeled, as such, view 590 also contains object class name 552, number of instances 554, instance size 556, total size of instances 558, instance index header 560, instance field header 562, variable name index header 564, data type index header 566, value index header 568, address index header 570, selected instance indicator 572, instance index 574*a-n*, variable name index 576*a-m*, data type index 578*a*-1, variable value index 580*a-o*, which includes sensitive values 580*b*, 580*e*, and 580*f*, and address value index 582*a-p*, which were discussed above in conjunction with FIG. 5B.

Scrubbed variables 590*b*, 590*e* and 590*f* are examples of variables that contain dummy information as a result of being scrubbed. In this example, scrubbed values 590*b*, 590*e* and 590*f* correspond to sensitive values 580*b*, 580*e*, and 580*f*, which prior to scrubbing contained the tenant name, the tenant billing address, and tenant credit card number. Although in the example the tenant names, addresses, and credit card information are shown as being scrubbed, other types of sensitive information may be scrubbed as well, such as the tenant's banking information. In other embodiments, such as for a small company, the tenant's name and address might not be scrubbed, because the tenant's name and address are likely public information and at least in a small company may already be known to the employees.

Figure 6:
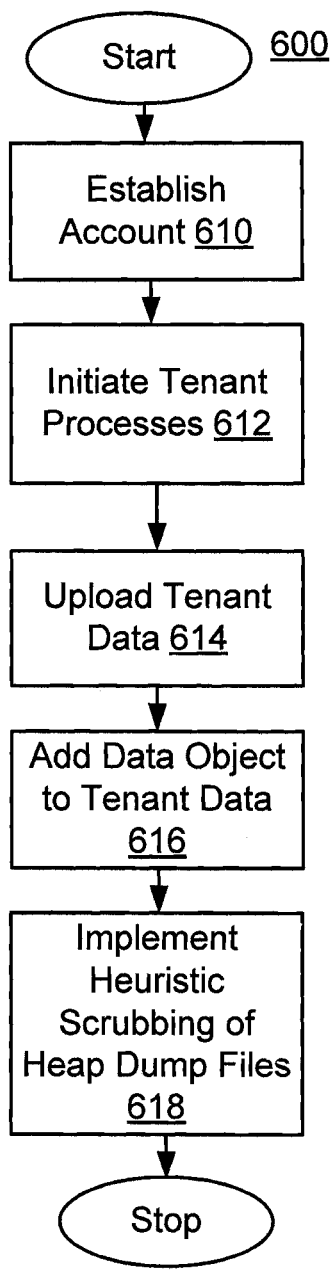
FIG. 6 shows a flowchart of an example of a method of using the environment of FIGS. 1 and 2.
Figure 7:
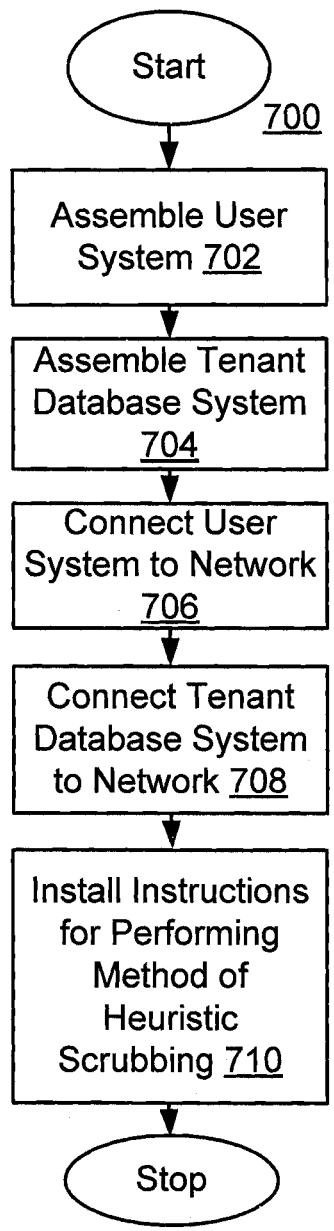
FIG. 7 shows a flowchart of an example of a method of making the environment of FIGS. 1 and 2.

Method for Creating the Environment (FIGS. 6 and 7)

FIG. 6 shows a flowchart of an example of a method 600 of using environment 10. In step 610, user system 12 (FIGS. 1 and 2) establishes an account. In step 612, one or more tenant process space 104 (FIG. 2) are initiated on behalf of user system 12, which may also involve setting aside space in tenant space 112 (FIG. 2) and tenant data 114 (FIG. 2) for user system 12. Step 612 may also involve modifying application metadata to accommodate user system 12. In step 614, user system 12 uploads data. In step 616, one or more data objects are added to tenant data 114 where the data uploaded is stored. In step 618, the method for heuristic scrubbing of sensitive and secure customer data from production application heap dump files in a database network system may be implemented. In another embodiment, although depicted as distinct steps in FIG. 6, steps 602-618 may not be distinct steps. In other embodiments, method 600 may not have all of the above steps and/or may have other steps in addition to, or instead of, those listed above. The steps of method 600 may be performed in another order. Subsets of the steps listed above as part of method 600 may be used to form their own method.

FIG. 7 is a method of making environment 10, in step 702, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 704, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers 100$_1$-100$_N$, system process space 102, tenant process spaces 104, tenant management process space 110, tenant space 112, tenant data 114, and application metadata 116 (FIG. 2).

In step 706, user system 12 is communicatively coupled to network 104. In step 708, system 16 is communicatively coupled to network 104 allowing user system 12 and system 16 to communicate with one another (FIG. 2). In step 710, one or more instructions may be installed in system 16 (e.g., the instructions may be installed on one or more machine readable media, such as computer readable media, therein) and/or system 16 is otherwise configured for performing the steps of methods for heuristic scrubbing of sensitive and secure customer data from production application heap dump files in a database network system. For example, as part of step 710, one or more instructions may be entered into the memory of system 16 for heuristic scrubbing of sensitive and secure customer data from production application heap dump files in a database network system.

In another embodiment, although depicted as distinct steps in FIG. 7, steps 702-710 may not be distinct steps. In other embodiments, method 700 may not have all of the above steps and/or may have other steps in addition to, or instead of, those listed above. The steps of method 700 may be performed in another order. Subsets of the steps listed above as part of method 700 may be used to form their own method.

Extensions and Alternatives

Regarding determining dependencies of objects in the heap dump, in an embodiment, while in a development environment, for example, the information about the object may be generated as part of a diagnostic routine and placed into the heap dump. For example, the diagnostic routine may cause a label to be generated anytime a particular class, a variable and/or method is invoked. The label may be stored in memory in association with the data generated from the class and/or method invoked. Then when a heap dump is generated the label is dumped with the rest of the data, labeling the data. In another embodiment, as source code is read by a compiler, a map of the objects and the dependency of each object on other objects is constructed and stored, based on the syntax of the source code. The reading of the source code to establish the class dependencies may be performed in addition to or instead of the labeling of the objects of the program. The reading of the source code to establish the class dependencies and/or the labeling of the objects of the program may be performed in addition to or instead of the other methods in this specification.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A machine implemented method comprising:
    analyzing, by a host system a heap dump to determine class dependencies, the host system including at least a processor system having at least one processor, and a memory system having at least one machine readable medium that stores contents of a heap dump, including content that was stored within at least a collection of memory cells used by a function that had been called while an application is running and was dumped into the machine readable medium;
    creating a map, by the processor system, of the heap dump, mapping the class dependencies, by mapping which classes depend on which classes;
    locating and erasing, by the host system, sensitive information, wherein the steps of locating and erasing sensitive information includes at least determining
        whether a piece of information originated from a particular class that is used for storing confidential information, and
        whether an object associated with the piece of information is of a particular type, and
    if the information originated from that particular class and the object is of the particular type, erasing the information in case the information is sensitive information;
    storing, by the host system, into the memory system information that remains after the erasing;
    rebuilding, by the host system, the content of the heap dump by at least reconstructing the class dependencies without the sensitive information, therein restoring dependencies of classes on other classes;
    a class dependency being an object from which another object derives functionality, the heap dump, after being rebuilt, includes the class dependencies, the reconstructing of the class dependencies including re-establishing references in objects to other objects that are relied on for functionality;
    the heap dump data including at least
        an instance dump portion, which is a portion of the heap dump data that includes at least an address of an object of interest, information related to a state of the object of interest that the object of interest was in just prior to the dump, and address of objects that referenced the object of interest, and
        a class dump portion, which is a portion of the heap dump that identifies objects created as specified by a particular class, the class dump includes at least address allocated to a class and a name of the class.

2. The method of claim 1, further comprising:
    loading the heap dump data into volatile memory;
    the mapping including at least creating objects in the volatile memory corresponding to objects referenced in the heap dump, the objects created having dependencies corresponding to dependencies indicated in the heap dump, the objects created being labeled with addresses indicated in the heap dump; and the method also including at least formatting the heap dump data into one or more views for viewing the heap dump data.

3. The method of claim 1, the creating of the map including at least comparing the instance dump and the class dump to determine the name of the object of interest in the instance dump; and storing a mapping having the name of the object of interest associated with the object in volatile memory.

4. The method of claim 3, the comparing including comparing addresses associated with objects of the instance dump to addresses associated with objects of the class dump; when a match is found between an addresses associated with an object of the instance dump with an address associated with an objects of the class dump, copying the name of the object of the class dump and associating the name of the object of the class dump with the name of the object of the instance dump.

5. The method of claim 1, the creating of the map including at least comparing the class dump of two different objects to determine a relationship between the two different objects; and storing an indication of the relationship as part of a mapping of relationships between objects of the heap dump.

6. The method of claim 5, the creating of the map including at least determining that an address associated with one of the two different objects is also associated with another of the two different objects.

7. The method of claim 1, the locating and the erasing of the sensitive information including at least determining dependencies of an object, and determining whether information of the object is associated with dependencies on objects having confidential information, erasing the information.

8. The method of claim 1, the locating and the erasing of the sensitive information including at least determining whether the information was stored in a variable that has a particular type that is expected to contain sensitive information, and if the information was stored in the variable that is of the particular type that is expected to contain sensitive information, erasing the information.

9. The method of claim 1, the locating and the erasing of the sensitive information including at least determining whether the information is associated with an instance of a class of a particular type that is expected to contain sensitive information, and if the information that is associated with the instance of the class of the type that is expected to contain sensitive information, erasing the information.

10. The method of claim 1, the locating and the erasing of the sensitive information including at least determining whether the information was stored in a variable that is greater than a particular size, and if the variable is greater than the particular size, erasing the information, the particular size being a size, such that variables greater than the particular size are expected to contain confidential information.

11. The method of claim 1, the heap dump data including the creating of the map including at least comparing the instance dump and the class dump to determine a name of the object of interest in the instance dump; and storing a mapping having the name of the object of interest associated with the object of interest in volatile memory comparing a class dump of two different objects to determine a relationship between the two different objects; and storing an indication of the relationship as part of a mapping of relationships between objects of the heap dump;

the locating and erasing including at least
determining
whether the information originated from the particular class that is used for storing confidential information, and
whether the object is of a particular type, and
if the information originated from that particular class and is of the particular type, erasing the information;
determining
whether the information originated from a class that inherits from a particular class that is used for storing confidential information and
whether the object is of a particular type, and
if the information originated from a class that inherits from the particular class that is used for storing confidential information and is of the particular type, erasing the information;
determining whether the information was stored in a variable that has a particular type that is expected to contain sensitive information, and
if the information was stored in the variable that is of the particular type that is expected to contain sensitive information, erasing the information;
determining whether the information was stored in a variable that is greater than a particular size, and
if the variable is greater than the particular size, erasing the information, the particular size being a size, such that variables greater than the particular size are expected to contain confidential information;

the method further comprising:
loading the heap dump data into volatile memory;
creating objects in the volatile memory corresponding to objects referenced in the heap dump,
the objects created having dependencies corresponding to dependencies indicated in the heap dump, and
the objects created being labeled with addresses indicated in the heap dump; and
formatting the heap dump data into one or more views for viewing the heap dump data; and
rendering the one or more views of the heap dump at the host machine.

12. The method of claim 1, the mapping including at least addresses of objects;
for each object, a number representing how many instances of the object were instantiated;
for each object, a list of addresses of referenced by the object; and
for each object, a name for the objects.

13. The method of claim 1, further comprising linking the class dump portion to the instance dump portion.

14. The method of claim 1, further comprising rendering at the host system, the content of the heap dump without the sensitive information that results after the rebuilding.

15. The method of claim 1, further comprising debugging, at the host system, an application that runs on the host system, based on the heap dump without the sensitive information.

16. The method of claim 1, the rebuilding further comprising reloading, at the host system, the heap dump into an application on the host system that displays the heap dump information with the heap dump information about a first object linked to heap dump information about a second object that the first object depends on, based on the heap dump without the sensitive information.

17. A machine-readable medium carrying one or more sequences of instructions, which instructions, when executed by one or more processors, cause the one or more processors to carry out a method comprising:

analyzing, by a host system, a heap dump to determine class dependencies, the host system including at least a processor system having at least one processor, and a memory system having at least one machine readable medium that stores contents of a heap dump, including content that was stored within at least a collection of memory cells used by a function that had been called while an application is running and was dumped into the machine readable medium;

creating a map, by the processor system, of the heap dump, mapping the class dependencies;

locating and erasing, by the host system, sensitive information, wherein the steps of locating and erasing sensitive information includes at least determining whether a piece of information originated from a particular class that is used for storing confidential information, and whether an object associated with the piece of information is of a particular type, and if the information originated from that particular class and the object is of the particular type, erasing the information in case the information is sensitive information;

storing, by the host system, into the memory system information that remains after the erasing;

rebuilding, by the host system, the content of the heap dump by at least reconstructing the class dependencies without the sensitive information, therein restoring dependencies of classes on other classes;

a class dependency being an object from which another object derives functionality, the heap dump, after being rebuilt, includes the class dependencies, the reconstructing of the class dependencies including re-establishing references in objects to other objects that are relied on for functionality;

the heap dump data including at least an instance dump portion, which is a portion of the heap dump data that includes at least an address of an object of interest, information related to a state of the object of interest that the object of interest was in just prior to the dump, and address of objects that referenced the object of interest, and a class dump portion, which is a portion of the heap dump that identifies objects created as specified by a particular class, the class dump includes at least address allocated to a class and a name of the class.

18. An apparatus comprising:

a processor system including one or more processors; and a memory system including one or more machine readable media;

the machine readable media storing one or more stored sequences of instructions which, when executed by the processor, cause the processor to carry out a method including at least analyzing, by a host system a heap dump to determine class dependencies, the host system including at least a processor system having at least one processor, and a memory system having at least one machine readable medium that stores contents of a heap dump, including content that was stored within at least a collection of memory cells used by a function that had been called while an application is running and was dumped into the machine readable medium, analyzing, by a host system, a heap dump to determine class dependencies including at least determining which class depends from which classes;

creating a map, by the processor system, of the heap dump, mapping the class dependencies, by mapping which classes depend on which classes;

locating and erasing, by the host system, sensitive information, wherein the steps of locating and erasing sensitive information includes at least determining whether a piece of information originated from a particular class that is used for storing confidential information, and whether an object associated with the piece of information is of a particular type, and if the information originated from that particular class and the object is of the particular type, erasing the information in case the information is sensitive information;

storing, by the host system, into the memory system information that remains after the erasing;

rebuilding, by the host system, the content of the heap dump by at least reconstructing the class dependencies without the sensitive information, therein restoring dependencies of classes on other classes;

a class dependency being an object from which another object derives functionality, the heap dump, after being rebuilt, includes the class dependencies, the reconstructing of the class dependencies including re-establishing references in objects to other objects that are relied on for functionality;

the heap dump data including at least an instance dump portion, which is a portion of the heap dump data that includes at least an address of an object of interest, information related to a state of the object of interest that the object of interest was in just prior to the dump, and address of objects that referenced the object of interest, and a class dump portion, which is a portion of the heap dump that identifies objects created as specified by a particular class, the class dump includes at least address allocated to a class and a name of the class.

\* \* \* \* \*